United States Patent [19]

Vilt

[11] 4,008,543
[45] Feb. 22, 1977

[54] METHOD AND APPARATUS FOR POSITIONING DEFORMABLE POTS IN A PREDETERMINED ARRAY

[76] Inventor: Anton L. Vilt, R.R. No. 4, Box 356-D, Wilmington, Ill. 60481

[22] Filed: Feb. 2, 1976

[21] Appl. No.: 654,388

[52] U.S. Cl. .................................. 47/1 A; 214/301; 211/126; 141/1; 47/86; 47/58
[51] Int. Cl.² ........................................ A47G 29/00
[58] Field of Search .............. 425/403; 47/1, 34.13; 211/41, 74, 76, 126; 214/301; 217/26.5; 141/1; 206/431

[56] References Cited
UNITED STATES PATENTS

| | | | |
|---|---|---|---|
| 1,560,028 | 11/1925 | Doyle | 214/301 |
| 2,311,709 | 2/1943 | Taylor | 214/301 |
| 3,337,986 | 8/1967 | Boucher | 47/1 |

*Primary Examiner*—Robert E. Bagwill
*Attorney, Agent, or Firm*—Kinzer, Plyer, Dorn & McEachran

[57] ABSTRACT

A method and apparatus for rapidly arranging a plurality of distortable pots of generally frustoconical shape in a predetermined pattern and holding the pots in that pattern for filling. The method includes the steps of positioning a plurality of pots in a predetermined pattern with the pots inverted; the walls of the pots are distorted so that the rim of each pot engages a substantial length of the rim of each adjacent pot. An inverted flat or similar container is placed over the pots and tightly engages and confines them. The pots and flat are turned upright and then filled while still maintained in the pattern by the flat. The apparatus for performing this method includes a frame having a plurality of individual pot supporting members arranged in a predetermined pattern on the frame. The apparatus also includes a release grate having grate elements positioned between the frame and the pots positioned on the pot supporting members. The grate elements engage the pots upon movement of the grate away from the frame, releasing the pots in unison from the pot supporting members. The grate also functions to hold the pots in position in the flat during filling operations.

18 Claims, 11 Drawing Figures

METHOD AND APPARATUS FOR POSITIONING DEFORMABLE POTS IN A PREDETERMINED ARRAY

BACKGROUND OF THE INVENTION

This invention relates to a method and apparatus for rapidly arranging and filling pots or other like plant containers with soil in preparation for planting of seeds or seedlings in the pots.

It has become common practice to use rather flexible, biodegradable containers or pots in connection with commercial greenhouse and truck garden operations, particularly in growing small plants (both flowers and vegetables) to be sold to individual home owners, gardeners, etc. These flexible pots, which are usually frustoconical in shape, are molded of a mixture of peat moss and sawdust or other similar materials. While pots can stand some abuse, they are subject to tearing and other damage in handling and filling.

The biodegradable pots are usually received by the greenhouse in tall stacks. The usual practice is to take the pots from a stack, fill them with soil or a mixture of soil, fertilizer and other materials one at a time, and plant a seedling or seed in the filled pot. A number of pots are then placed in a shallow wooden or plastic tray, called a "flat". The pots remain in the flat during the initial growing state and many times the seeded pots are transferred in the flat to the point of sale or planting.

The present method of removing the individual pots from a tall stack as they are received, filling them one by one with soil, planting a seed or seedling in each pot and placing each pot individually in a flat, is a very time consuming procedure.

Accordingly, it is an object of this invention to provide a method and apparatus for rapidly arranging a large number of biodegradable pots in a predetermined pattern or arrangement so that the pots will fit snugly into a flat where they can rapidly be filled with soil in a single operation.

SUMMARY OF THE INVENTION

In accordance with the method and apparatus of this invention, a plurality of distortable frustoconical biodegradable pots are arranged in spaced relationship to one another in a predetermined layout or pattern which will fit in a conventional gardening flat. The pots are held in that relationship during filling of the pots with soil. The method includes the steps of arranging a plurality of the pots in a predetermined pattern on a frame. Each pot is inverted and the side wall thereof is often distorted so that the rim of each pot in the pattern engages an appreciable length of the rim of each adjacent pot. A gardening flat or similar shallow container is inverted and placed snugly over the pots. The pots and flat are inverted and placed in an upright position on a supporting surface. The distortion of the side walls of the pots, from round to somewhat square, leaves very little in the way of open areas between the rims of the pots. Consequently, all the pots can be filled with soil at the same time and little soil will fall to the bottom of the flat. Any remaining opening is covered by the stripper grate.

BRIEF DESCRIPTION OF THE DRAWINGS

The invention is illustrated more or less diagrammatically in the following drawings, wherein.

DETAILED DESCRIPTION OF THE INVENTION

Figure 1:
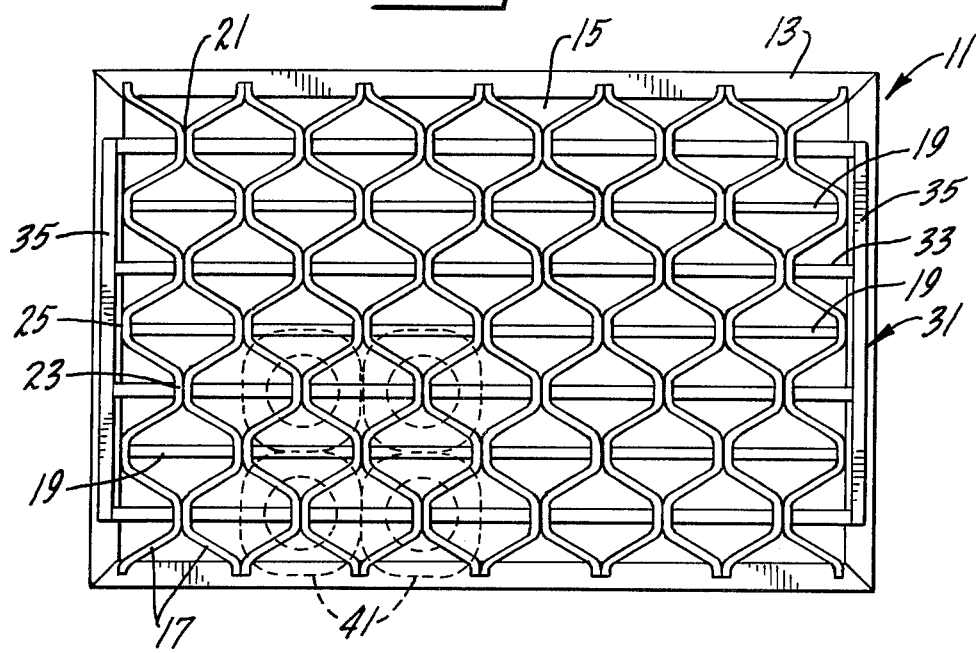
FIG. 1 is a top plan view of one form of device of this invention.

FIG. 1 of the drawings shows one form of device 11 for use in practicing the method of this invention. Device 11 includes a rectangular frame 13 having a large central opening 15 spanned by a plurality of reinforcing bars 19. A series of bent wire rack members 17 are fastened to frame 13, to reinforcing bars 19, and to one another, forming a plurality of individual pot racks 21 which are positioned across the central opening 15 of the frame. The rack members 17 are fastened to the frame in an inclined upstanding position with pairs of wire rack members inclined towards each other. The pot racks 21 are formed where upstanding portions 23 of the rack members 17 meet and are joined to similar upstanding portions 23 of adjacent rack members. The rack members 17 are fastened to reinforcing bars 19 at their lower portions 25. Each pot rack 21 is in the shape of a cone or pyramid having a peak formed where the upstanding portions 23 of adjacent racks are fastened together.

A release grate 31 is located between the bent wire rack members 17 and the rectangular frame 13. Release grate 31 includes a plurality of grate elements 33. The grate elements are elongated bars which are aligned with the peak portions 23 of the individual pot racks 21 and extend longitudinally of the rectangular frame 13. The grate elements 33 are connected at their ends by cross bars 35, which rest on the rectangular frame 13. Release grate 31 is movable between a first position in which it rests on frame 13 and a release position (31A, FIG. 2) displaced an appreciable distance from frame 13.

Figure 3:
FIG. 3 is a side elevational view of a stack of pots of the type used in the method of this invention.

A typical pot 41 is frustoconical in shape, and, if biodegradable, is generally molded from a mixture of peat and sawdust. Containers of other compositions may also be used if they have the requisite amount of flexibility. These pots are usually received by the nursery in tall, nested stacks 43 of the type shown in FIG. 3.

Figure 2:
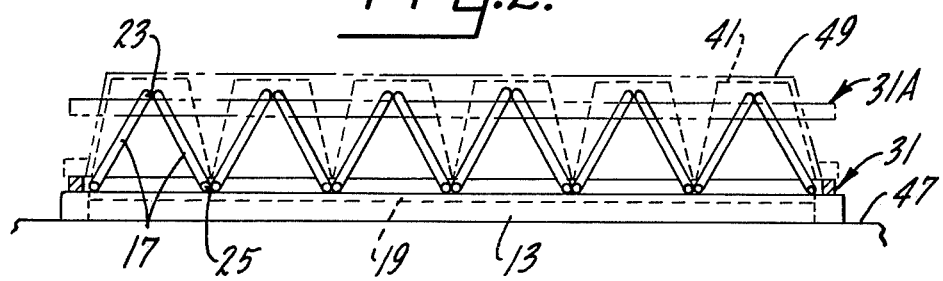
FIG. 2 is a side elevational view showing the device of FIG. 1 used in performing the method of this invention.

When device 11 is positioned on a surface such as a table or bench 47 in the manner shown in FIG. 2, one pot 41 may be placed on each rack 21 of the apparatus 11. The lower portions 25 of the bent wire rack 21 are slightly wider than the open top portion of the pot 41. Thus, as each pot 41 is inverted and positioned on a rack 21, the conical walls of the pot are squared or distorted in the manner shown by dashed lines in FIG. 1. The rim of each pot is flattened and engages an appreciable length of the rim of each adjacent pot. The engagement of the pot rims thus reduces the amount of open space between the pots when pots are positioned on all of the racks of the rectangular frame.

When pots are mounted on all of the racks, a flat 49, dimensioned to afford a tight enclosure to receive all of the pots, is inverted and positioned over the bottom portions of the pots in the manner shown in FIG. 2 of the drawings. The flat 49, device 11 and pots 41 are then turned over so that the flat rests on the bench or table and the plant containers open upwardly. The pots can now be filled with a small amount of soil or with any desired potting material by pouring or distributing the filling material through the open racks and into the pots. This small amount of filling material will hold the pots in the flat and prevent pop-out of the pots. Because the side walls of the pots are distorted from their normal conical shapes to somewhat squared shaped, the openings between the pots are minimized and only a small amount of soil passes between the pots and into the flat.

Either before or after the deposit of filling material in the pots, the rectangular frame 13 is raised while the release grate 31 is held against upward movement. This action releases the pots 41 from the racks 21, leaving the pots properly positioned in the flat 49.

Figure 4:
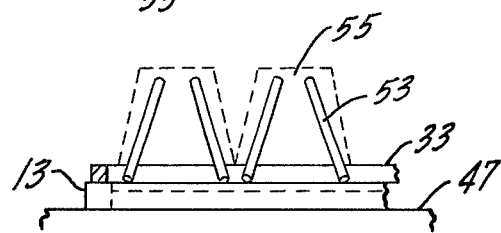
FIG. 4 is a partial, top plan view of a modified form of device of the invention.
Figure 5:
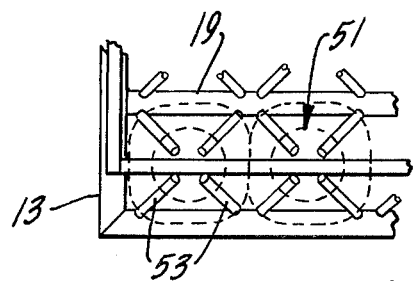
FIG. 5 is a partial side elevational view of the device of FIG. 4.

A modified form of device for use in performing the method of this invention is shown in FIGS. 4 and 5 of the drawings. In this modified device, the racks 51 are formed of individual wire rods 53 mounted on the rectangular frame 13 and the reinforcing bars or rods 19 that form a part of the frame. Each rack is formed by four wire rods 53 which converge in a pyramidal peaked rack for each pot 55. A release grate 31 is located between the wire racks 51 and the frame 13 and functions in the same manner as the release grate described in connection with the device of FIGS. 1 and 2.

Another modified device 61 for performing the method of this invention is shown in FIGS. 6 through 10 of the drawings. Device 61 includes a rectangular frame 63 which may be cut or otherwise formed from a block of suitable material such as wood or preformed plastic. The frame 63 includes a base 65 on which a plurality of upstanding individual pot supporting members 67 are integrally formed. The pot supporting members are arranged in a predetermined pattern with adjacent pot supporting members aligned in both longitudinal and transverse directions. Each pot supporting member is in the shape of a truncated, rectangular pyramid which tapers from the base 65 to a top surface 69. Each pot supporting member has its longer side walls 71 extending along the length of the base and its shorter end walls 73 extending transversely of the base. The longer side walls 71 of each pot supporting member have steeper slopes than those of the shorter end walls 73 so that the top surface 69 of the pot supporting member is approximately square. The pot supporting members are separated by longitudinally extending aisles 75 and transversely extending aisles 77. At the base of each pot supporting member, the end walls 73 are spaced apart a greater distance than the side walls 71, thus causing the side wall of a pot placed on a pot supporting member 67 to assume an oval shape with the major axis of the oval extending along the length of the frame.

A pot release grate 81 is formed with longitudinally extending release elements 83 which are sized and spaced to fit in the longitudinally extending aisles 75 of the frame 63. Each release element 83 is formed from an elongated piece of metal of V-shaped cross-section, fastened at opposite ends to cross members 85 which also may be formed of suitable metal. The members may be fastened to each other by welding, brazing, or through the use of suitable fasteners. A clamp 87 in the form of inverted U-shaped wire is welded or otherwise fastened to the grate release elements 83 at the middle of the grate. Legs 89 formed at the ends of the wire clamp are positioned to contact the side walls of a flat or tray.

Tray engaging clamps 91, also formed from lengths of wire, are located at the ends of the grate and are mounted on the end cross members 85. The clamps 91 include integral legs 93, which attach to the cross members 85, and loops 95 formed at the outer ends of the legs with the loops of opposite legs of a clamp connected by a cross member 97. The cross member 97 also may function as a handle to permit manipulation of the release grate and facilitate its removal from a flat.

A typical pot 101 is frustoconical in shape, and, if biodegradable, is generally molded from a mixture of peat and sawdust. Containers of other compositions may also be used if they have the requisite amount of flexibility. As previously discussed, these pots are usually received in tall nested stacks.

Figure 6:
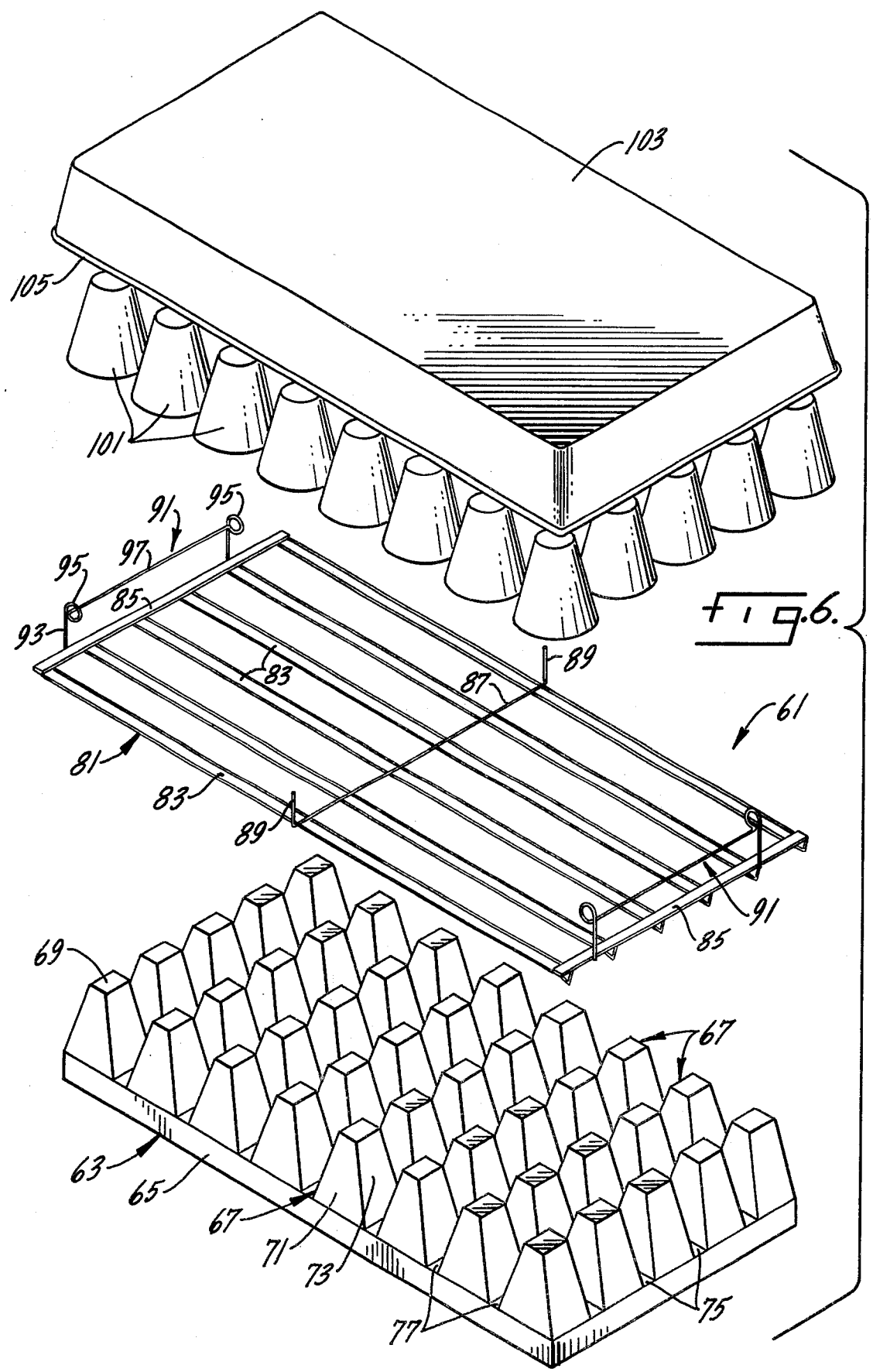
FIG. 6 is an exploded, perspective view of yet another modified form of device of this invention.

The frame 63 is usually placed on a table, bench or other supporting surface in the manner shown in FIG. 6 of the drawings with the pot supporting members 67 standing upright. The release grate 81 is then placed on the frame 63 with its release elements 83 located in the longitudinally extending aisles 75 of the frame 63 and with its clamps 87 and 91 extending upwardly. With the frame and release grate so arranged, a worker then removes the pots 101 from a nested stack of pots and places an inverted pot on each of the pot supporting members 67, preferably starting at one corner of the frame and placing the pots on the pot supporting members a row at a time. Since the side walls 73 of each pot supporting member are spaced apart adjacent the base 65 of the frame 63 a distance greater than the inside diameter of the conical wall of a pot at the open end thereof, each pot will be distorted from a conical to an elongated shape as it is positioned on a pot supporting member. Also, as the pots 101 are positioned on the pot supporting members 67, the side walls of each pot will be flattened so that the pot rim engages an appreciable portion of the rim of each adjacent pot. The engagement of the rims of the pots reduces the amount of open space between the pots at their open ends.

When pots are mounted on all of the pot supporting members 67, a flat or tray 103, dimensioned to tightly engage and receive all the pots, is inverted and positioned over the bottom portions of the pots. The flat is pushed down over the pots until its rim 105 slips over the loops 95 of the grate clamp members 91 located at opposite ends of the release grate. The rim of the flat also engages and is squeezed inside the legs 89 of grate clamp member 87. This clamp member prevents the sides of the flat to distort outwardly.

Figure 7:
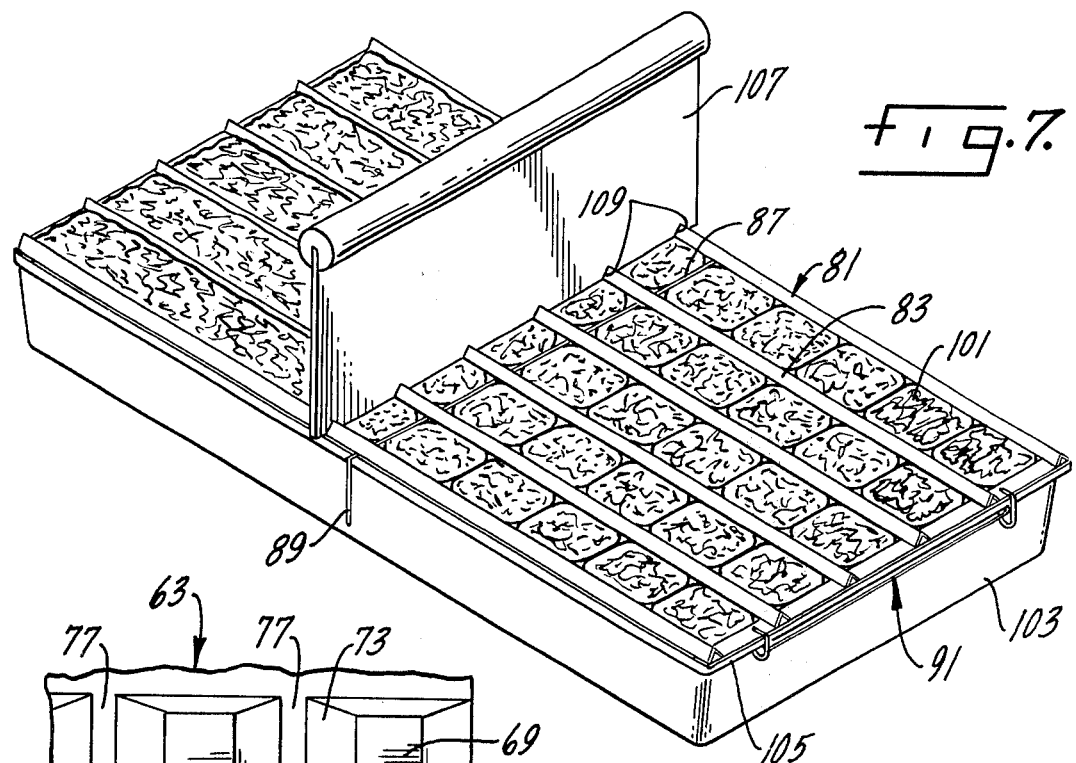
FIG. 7 is a perspective view showing the pots being filled with soil using the device of FIG. 6.
Figure 8:
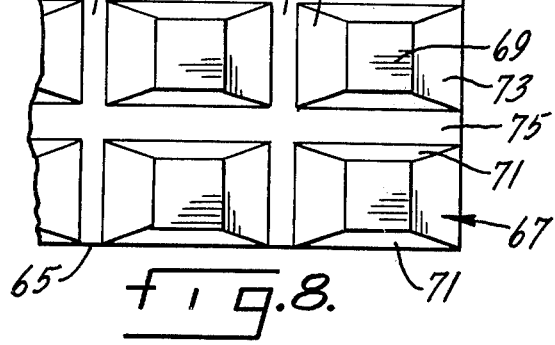
FIG. 8 is an enlarged, partial top plan view of the frame of FIG. 6.
Figure 9:
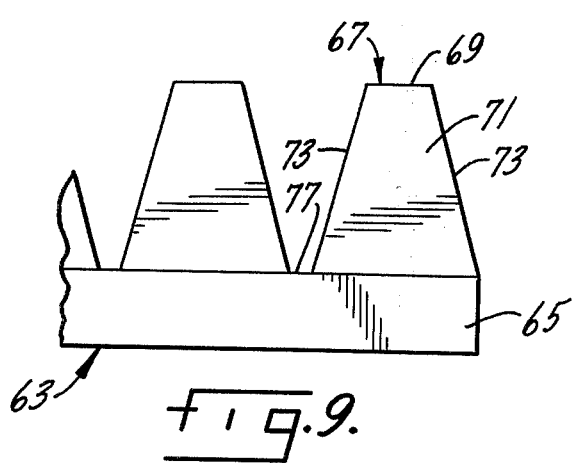
FIG. 9 is a partial side elevational view of the frame of FIG. 8.

The worker then lifts the grate by the clamp cross members 97. The grate release elements 83 engage and thereby raise the pots 101 and the flat 103 from the frame 63. The flat and its pots are then inverted and positioned on a supporting surface with the pots opening upwardly as depicted in FIG. 7. The grate, by means of its V-shaped release elements 83, rests on the pots 101 and holds them in their distorted positions in the flat 103. The V-shaped release grates 83, whose peaks now point upwardly, cover portions of the open spaces between the adjacent longitudinal rows of pots. The pots can now be filled by simply pouring soil or other potting material into the flat. Excess soil may be removed and the remaining soil may be leveled through the use of a scraper 107 having V-shaped notches 109 which fit over and engage the V-shaped grate release members 83. After the scraper is run the length of the flat, the grate 81 may be released from the flat and reinstalled on a frame 63 for a new operation.

Figure 10:
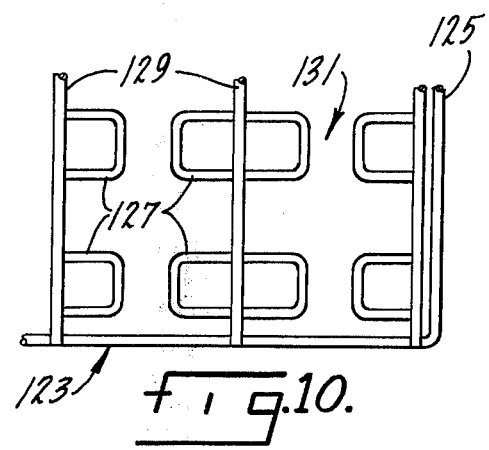
FIG. 10 is a partial plan view of an alternate construction for the frame of FIGS. 6–8.
Figure 11:
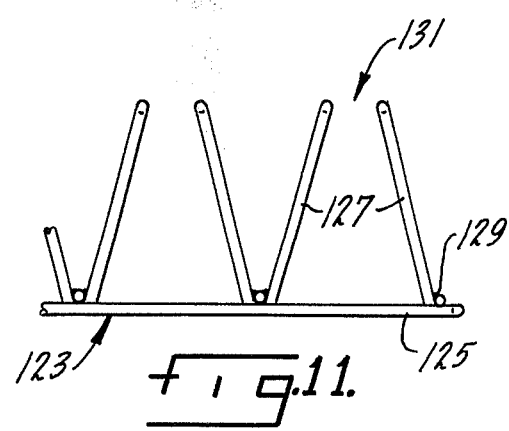
FIG. 11 is a partial elevation view of the frame of FIG. 10.

FIGS. 10 and 11 illustrate a frame 123 that may be substituted for the frame 63 in the device of FIGS. 6–9. Frame 123 comprises a rectangular rim 125 formed of rod or bar stock with a plurality of transverse reinforcing bars 129 mounted on the rim. A multiplicity of inverted U-shaped rack elements 127 are welded or otherwise affixed to the reinforcing bars 129, each pair of converging rack elements 127 affording a pot supporting member 131 that is functionally equivalent to the pot supporting members 67 of frame 63 (FIGS. 6–9).

Frame 123 (FIGS. 10, 11) is used, in performing the method of the invention, in conjunction with a release grate such as grate 81 and a flat, as described above for FIGS. 6 and 7. The frame is placed on a bench or other support (it can be mounted permanently if desired) with the pot supporting members facing upwardly. The release grate is positioned on the frame, with the release members 83 between rows of pot supporting members. The frame 123 is then loaded with pots, the pots facing down onto the support members, and a flat 103 is placed on the pot-laden frame. The flat should afford a tight fit with the pots, and it is usually necessary to apply some force, pounding the flat over the pots. Some judicious pounding on the bottom of the flat will straighten any crooked pot.

The resulting assembly of the flat 103, the pots, and the release grate 81, is then lifted from the frame 123, inverted, and filled as described above. The assembly is held together by the clamps 87 and 91 when the complete release grate structure 81 of FIG. 6 is employed. The clamps 87 and 91 can be eliminated, however, in which case the flat and the release grate should be lifted simultaneously from the frame to maintain the assembly complete during inversion and filling.

I claim:

1. An apparatus for use in positioning deformable pots in a predetermined pattern for insertion in a flat or like container, comprising:
   a frame, including a rim defining a central opening and a plurality of individual, upstanding pot supporting members arranged in a predetermined pattern filling said central opening, each pot supporting member engaging and supporting a single flexible pot to maintain a plurality of pots in a tightly packed array corresponding to said pattern,
   and a release grate, including a member of release elements positioned between said frame and the pots positioned on said pot supporting members,
   said release elements engaging all of said pots upon movement of said release grate away from said frame to thereby release said pots in unison from said supporting members.

2. The apparatus of claim 1 in which each support member tapers in a direction away from said frame.

3. The apparatus of claim 1 in which said pot supporting members are of truncated, generally conical configuration, with the base of each member located adjacent the frame.

4. The apparatus of claim 1 in which each pot support member is shaped to distort the wall of a pot positioned on said support.

5. The apparatus of claim 1 in which the spacing between said pot supporting members and the configuration of the supporting members is such that the side walls of a pot positioned on a support member are distorted and the rim of each pot engages the rim of the pots positioned on adjacent support members.

6. The apparatus of claim 1 in which said grate release elements extend between adjacent rows of said pot supporting members.

7. The apparatus of claim 6 in which said release grate is removable from said frame.

8. The apparatus of claim 7, and further comprising clip means to engage the walls of a flat so that the grate release member can function to hold the pots in the flat upon removal of the release grate, pots, and flat from said frame.

9. The apparatus of claim 8 in which said grate release elements engage the rims of said pots while said grate is attached to said flat.

10. The apparatus of claim 1 in which said grate release elements each extend across the central portions of a row of said pot supporting members.

11. The apparatus of claim 10 in which the release grate is irremovably captured between the rim and the pot supporting members of the frame.

12. The apparatus of claim 1 in which the pot supporting members are of open construction, each formed of a plurality of metal rod elements.

13. The apparatus of claim 12 in which each pot supporting member comprises two inverted U-shaped metal rod elements inclined toward each other.

14. A method of rapidly arranging a plurality of distortable pots in a predetermined pattern for subsequent operations, including the steps of:
   positioning a plurality of said pots on a support frame in a predetermined array with the pots inverted and with each pot having its side walls distorted so that the rim of each pot engages an appreciable length of the rim of adjacent pots,
   positioning means against said pots to hold said pots against said support frame during inversion of said pots to an upright orientation,
   and thereafter inverting said array of pots, in unison, to establish said pots in an upright orientation ready for filling while maintaining said pots in their distorted condition and in said predetermined array.

15. The method of claim 14 in which the step of positioning said means against said pots to hold said pots against the support frame during inversion of said pots to an upright orientation includes the positioning of a flat, tray or like container on said array of pots with the walls of said container confining said pots and maintaining said pots in said array.

16. The method of claim 15 including the additional step of positioning a release grate on the support frame prior to the positioning of the pots thereon,
   the release grate, the pots and the container being inverted conjointly as an assembly.

17. The method of claim 16, including the additional step of at least partially filling the pots before removing the release grate from the array of pots, the release grate serving to hold the array of pots in the container.

18. The method of claim 17 including the additional step of utilizing the release grate as a guide in levelling fill material in the pots.

* * * * *